United States Patent
Chang et al.

(10) Patent No.: US 8,404,374 B2
(45) Date of Patent: Mar. 26, 2013

(54) ELECTRONIC DEVICE WITH BATTERY COVER WATERPROOF STRUCTURE

(75) Inventors: Cheng-Fu Chang, Taipei (TW); Ting-Fang Lee, Taipei (TW); Chun-Yin Wang, Taipei (TW)

(73) Assignee: Inventec Corporation, Taipei (TW)

( * ) Notice: Subject to any disclaimer, the term of this patent is extended or adjusted under 35 U.S.C. 154(b) by 437 days.

(21) Appl. No.: 12/833,008

(22) Filed: Jul. 9, 2010

(65) Prior Publication Data
US 2011/0305934 A1    Dec. 15, 2011

(30) Foreign Application Priority Data

Jun. 11, 2010  (TW) .............................. 99211265 U

(51) Int. Cl.
*H01M 2/10* (2006.01)
*H01M 2/00* (2006.01)
*H01M 2/08* (2006.01)

(52) U.S. Cl. ......... 429/100; 429/163; 429/175; 429/185
(58) Field of Classification Search .................. 429/100, 429/163, 171, 172, 174, 175, 176, 185
See application file for complete search history.

(56) References Cited

U.S. PATENT DOCUMENTS 5,845,803 A * 12/1998 Saito et al. ................... 220/378
6,730,432 B1 * 5/2004 Grosfeld et al. ............... 429/97

* cited by examiner

*Primary Examiner* — Milton I Cano
*Assistant Examiner* — Carlos Barcena
(74) *Attorney, Agent, or Firm* — CKC & Partners Co., Ltd.

(57) ABSTRACT

An electronic device with a battery cover waterproof structure includes a body having a first end and a second end, a battery compartment disposed in the body, a waterproof gasket disposed in the battery compartment, and a battery cover coupled to the body. The waterproof gasket includes an oblique engage surface, and one end of the oblique engage surface near the first end is elevated higher than the other end of the oblique engage surface near the second end. The battery cover has an oblique rib arranged corresponding to in the oblique engage surface. One end of the oblique rib near the first end is elevated higher than the other end of the oblique rib near the second end. The oblique rib will interfere with the oblique engage surface for sealing the battery compartment when the battery cover is pushed towards one end of the battery compartment near the first end.

8 Claims, 7 Drawing Sheets

ELECTRONIC DEVICE WITH BATTERY COVER WATERPROOF STRUCTURE

RELATED APPLICATIONS

This application claims priority to Taiwan Application Serial Number 99211265, filed Jun. 11, 2010, which is herein incorporated by reference.

BACKGROUND

1. Field of Invention

The present invention relates to an electronic device. More particularly, the present invention relates to an electronic device with a battery cover waterproof structure.

2. Description of Related Art

With the advance of technologies, hand-held electronic devices become assisting tools popularly used in daily life. For example, common hand-held electronic devices include personal digital assistants (PDAs), mobile phones including smart phones. These hand-held electronic devices have the advantages of small volume, light weight and portable convenience, and thus are adopted by more and more people, and the functions thereof are more and more broad, and the product applications thereof are more diversified.

Most of the hand-held electronic devices have battery compartments and covers for securing batteries, and the existing battery waterproof mechanisms mostly achieve the waterproof efficacy using vertical press-fit of a robber ring and a hard plastic rib. In order to obtain locking force needed for front vertical press-fit, it usually requires a locking mechanism fitting with a larger battery cover. Since the locking mechanism has a larger size, the appearance designs of such hand-held electronic devices are limited.

SUMMARY

Hence, an aspect of the present invention is to provide an electronic device with a battery cover waterproof structure which is obliquely sealed, thereby reducing the space requires for the battery cover waterproof structure.

According to an embodiment, an electronic device with a battery cover waterproof structure is provided and includes a body having a first end and a second end; a battery compartment disposed in the body; a waterproof gasket disposed around outside of the battery compartment; a push button disposed on the body; and a battery cover coupled to the body. The waterproof gasket includes an oblique engage surface, and one end of the oblique engage surface near the first end is elevated higher than the other end of the oblique engage is surface near the second end. The push button is disposed adjacent to one end of the battery compartment near the first end, and includes a plurality of clips. The battery cover includes an oblique rib arranged corresponding to the oblique engage surface, and one end of the oblique rib near the second end is elevated higher than the other end of the oblique rib near the first end. The battery cover further includes a plurality of grooves, wherein, when the battery cover is pushed towards the first end of the battery compartment from the second end thereof, the oblique rib will interfere with the oblique engage surface for sealing the battery compartment, the waterproof gasket disposed between the battery compartment and the battery cover, and the clips will be engaged with the grooves for securing the battery cover.

The waterproof gasket is formed from plastic preferably. The push button further included an elastic member for providing the push button with an elastic return force after the push button is pressed down. Each of the clips has an inclined surface. The body further includes a plurality of positioning slide blocks disposed on an external side of the battery compartment. The battery cover further includes a plurality of positioning clips corresponding to the positioning slide blocks. The positioning slide blocks are disposed backwards from the battery compartment. Each of the positioning slide blocks has a substantially L-shaped cross section. The electronic device with the battery cover waterproof structure further includes a plurality of recesses and a plurality of protruding blocks. The recesses are disposed at the second end of the body, and the protruding blocks are disposed at the other end of the battery cover corresponding to the second end of the body, wherein the protruding blocks are adapted to engage with the recesses for positioning.

In the electronic device with the battery cover waterproof structure described above, the oblique rib of the battery cover is sealed with the oblique engage surface of the waterproof gasket disposed around outside of the battery compartment, thereby achieving excellent waterproof efficacy. In comparison with the seating method using front press-fit, the design of the present invention using the oblique engagement can effectively reduce the space required for the waterproof structure.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
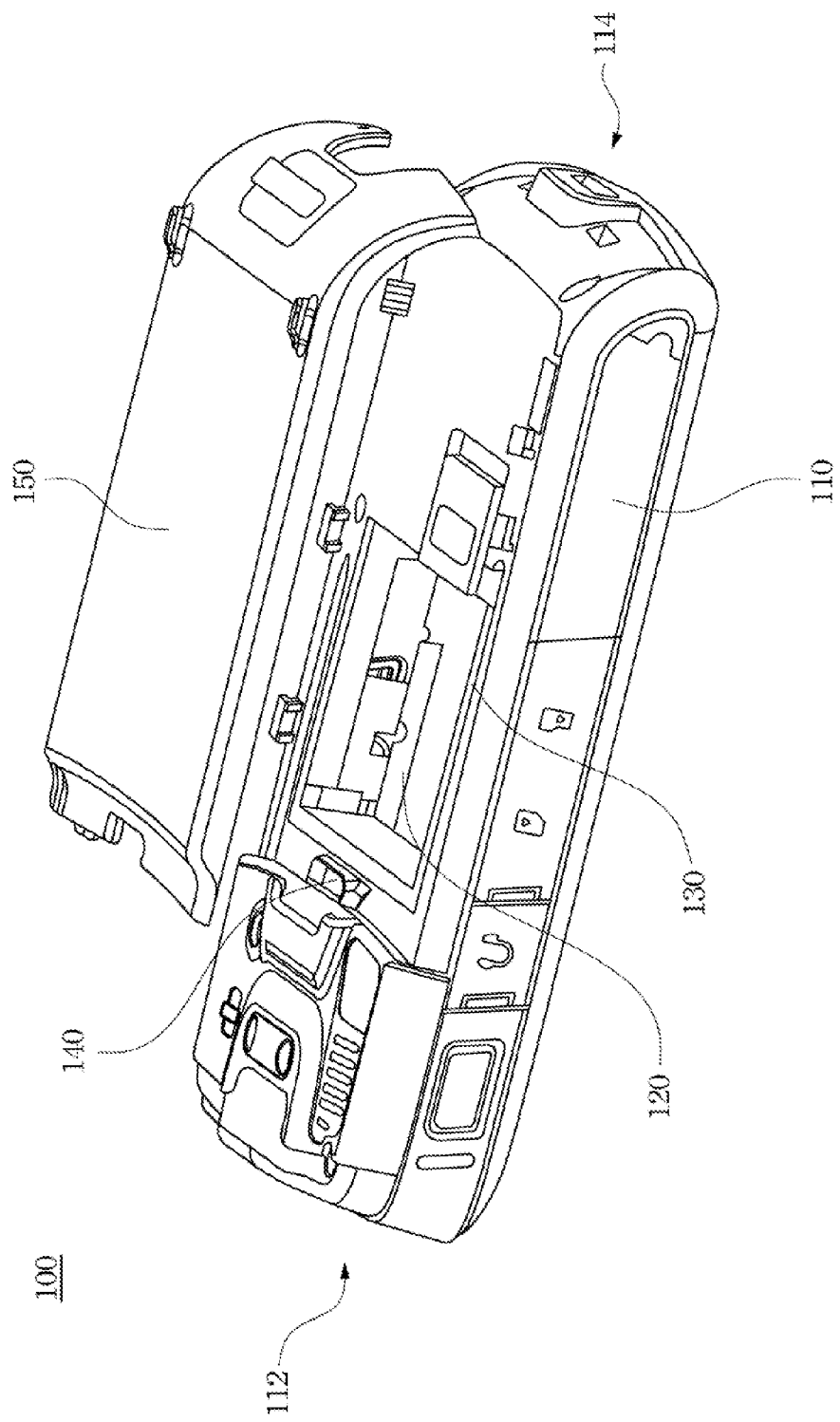
FIG. 1 is a schematic explosive diagram of an electronic device with a battery cover waterproof structure according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, FIG. 1 is a schematic explosive diagram of an electronic device 100 with a battery cover waterproof structure according to an embodiment of the present invention. The electronic device 100 includes a body 110; a battery compartment 120 disposed in the body 110; a waterproof gasket 130 disposed around outside of the battery compartment 120; a push button 140 disposed at one end of the battery compartment 120; and a battery cover 150. The waterproof gasket 130 is disposed between the battery compartment 120 and the battery cover 150. The body 110 includes a first end 112 and a second end 114 opposite to the first end 112. The push button 140 is disposed adjacent to one end of the battery compartment 120 near the first end 112. The battery cover 150 is moved from the second end 114 towards the first end 112 so as to engage with the push button 140 and thus is positioned.

Figure 2A:
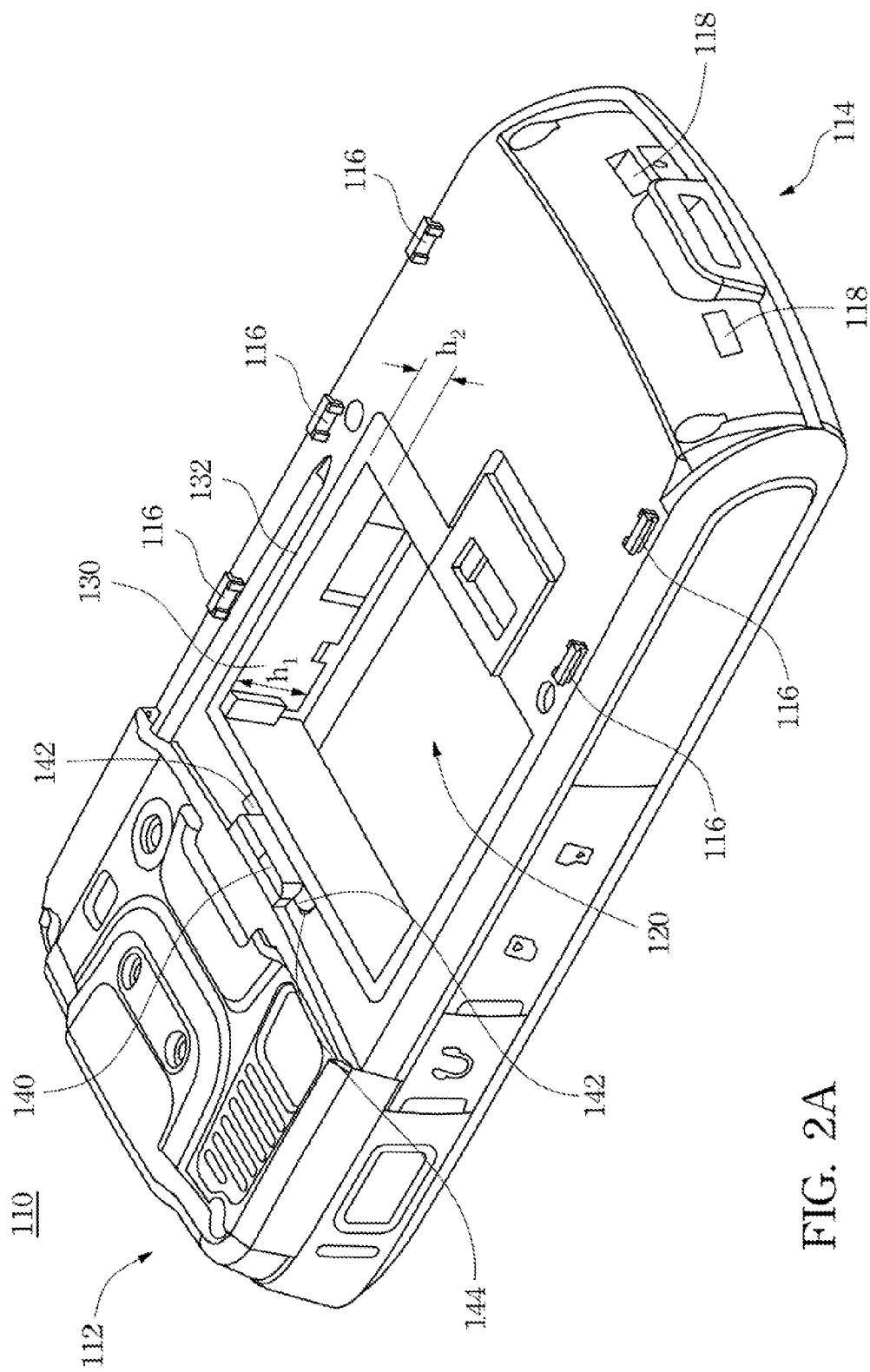
FIG. 2A and FIG. 2B are schematic diagrams respectively showing a body 110 and a battery cover 150 of FIG. 1.
Figure 2B:
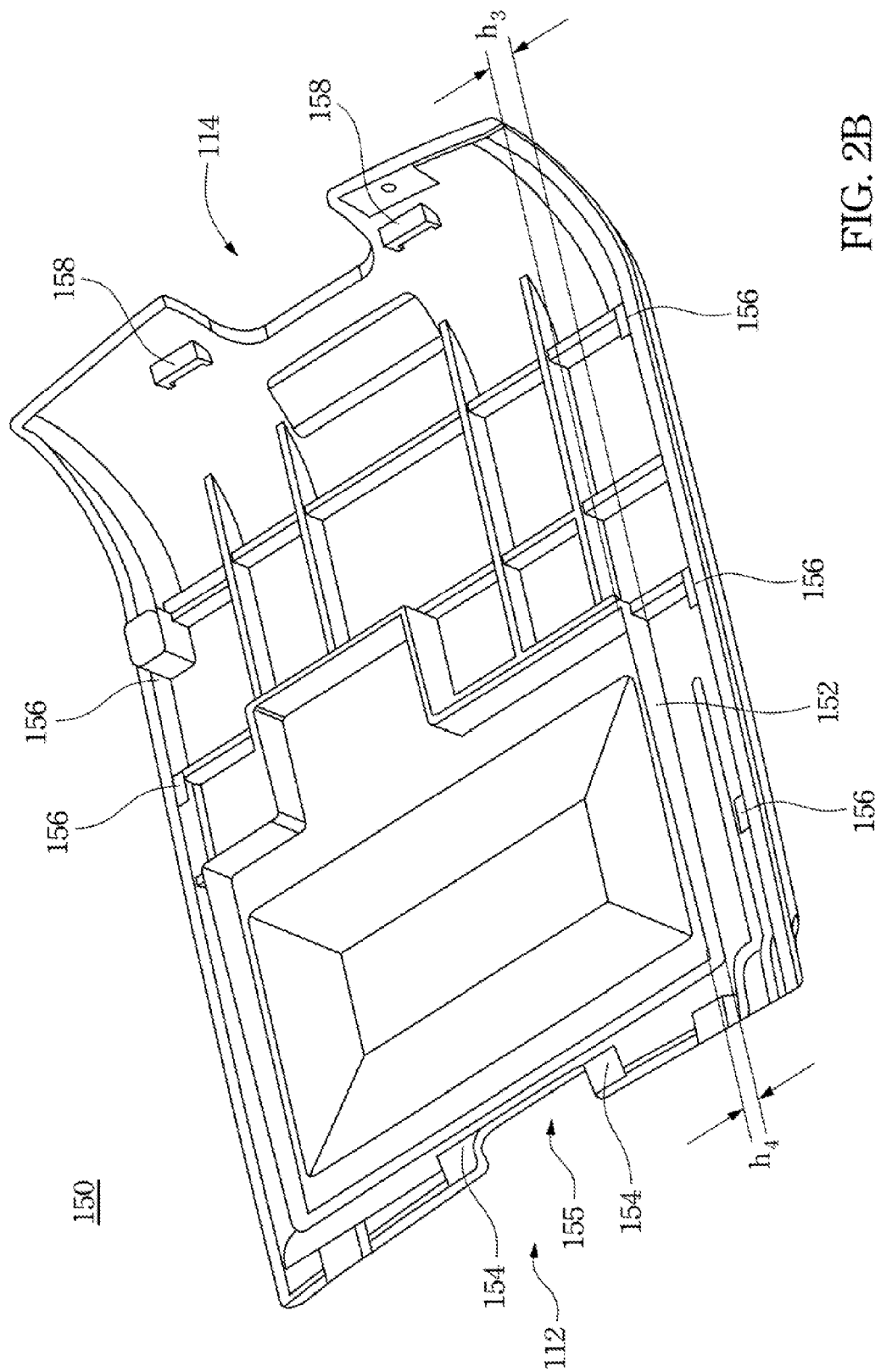

Referring to FIG. 2A and FIG. 2B simultaneously, FIG. 2A and FIG. 2B are schematic diagrams respectively showing the body 110 and the battery cover 150 of FIG. 1. The body 110 has the battery compartment 120 disposed therein, and the battery compartment 120 has the waterproof gasket 130 disposed therein, wherein the waterproof gasket 130 includes an oblique engage surface 132, and the oblique engage surface 132 is slanted from the first end 112 towards the second end 114. In other words, the height $h_1$ of one end of the oblique engage surface 132 near the first end 112 is greater than the height $h_2$ of the other end of the oblique engage surface 132 near the second end 114. The waterproof gasket 130 is formed from plastic preferably.

A plurality of positioning slide blocks 116 are further disposed on the body 110, and are on an external side of the battery compartment 120, wherein each of the positioning slide blocks 116 has a substantially L-shaped cross section, and is disposed backwards from the battery compartment 150. The body 110 further includes a plurality of recesses 118 disposed at the second end 114, wherein the recesses 118 extend from the second end 114 towards the first end 112, and the opening of each recess 118 faces towards the second end 114.

The push button 140 further includes an elastic member (not shown) disposed under the push button 140, wherein the elastic member is disposed inside the body 110 for providing the push button 140 with an elastic return force after the push button 140 is pressed down. The push button 140 includes a plurality of clips 142, wherein the clips 142 is monolithically formed with the push button 140, preferably, so that the clips 142 will move downwards together with the push button 140 when the push button 140 is pressed down.

The battery cover 150 is adapted to engage with the body 110, and includes an oblique rib 152 arranged corresponding to the oblique engage surface 132 of the waterproof gasket 130, wherein the oblique rib 152 is preferably formed from hard plastic. The height $h_3$ of one end of the oblique rib 152 near the second end 114 is elevated higher than the height $h_4$ of the other end of the oblique rib 152 near the first end 112, so that some interferences will occur between the oblique rib 152 of hard material and the waterproof gasket 130 of soft material for making the oblique rib 152 sealed with the oblique engage surface 132, when the battery cover 150 is engaged with the body 110.

The battery cover 150 further includes a plurality of grooves 154 which are disposed at one end of the battery cover 150 near the first end 112 and are corresponding to the clips 142 disposed on the push button 140. The battery cover 150 has a gap 155 disposed between the grooves 154. Each of the clips 142 disposed on the push button 140 has an inclined surface 144, so that the battery cover 150 can contact the clips 142 having the inclined surfaces 144 so as to press down the push button 140 and the clips 142, when the battery cover 150 is pushed towards the first end 112 from the second end 114. Thereafter, after the battery cover 150 moves over the inclined surfaces 144, by means of the elastic force provided by the elastic member, the clips 142 and the push button 140 is lifted and return to their original positions, thereby enabling the clips 142 to be engaged with the grooves 154; and exposing the push button 140 from the gap 155 of the battery cover 150.

The battery cover 150 further includes a plurality of positioning clips 156 corresponding to the positioning slide blocks 116 disposed on the body 110, wherein the positioning clips extend towards the battery compartment 120, so that the positioning clips 156 will slide into the corresponding positioning slide blocks 116 for preventing the battery cover 150 from separating from the body 110, when the battery cover 150 is slid from the second end 114 towards the first end 112 so as to engage with the body 110.

The battery cover 150 further included a plurality of protruding blocks 158 corresponding to the recesses 118, wherein the moving direction of the protruding blocks 158 is parallel to a line connected between the first end 112 and the second end 114. When the battery cover 150 is slid from the second end 114 towards the first end 112 so as to engage with the body 110, the protruding blocks 158 of the battery cover 150 can be inserted into the recesses 118 of the body 110, thereby preventing the battery cover 150 from separating from the body 110.

Figure 3A:
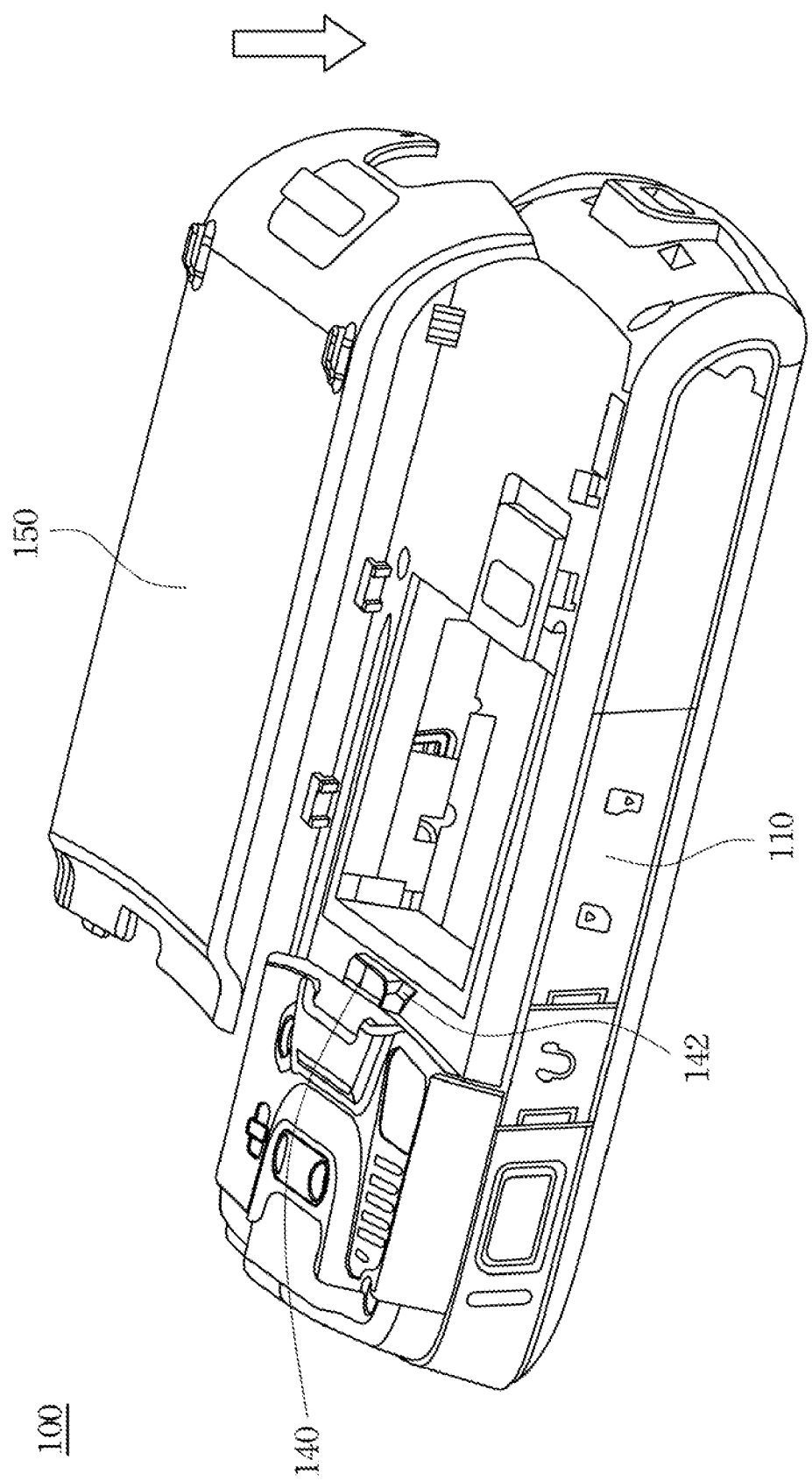
FIG. 3A to FIG. 3C are schematic diagrams respectively showing various stages for assembling the electronic device with the battery cover waterproof structure according to the embodiment of the present invention.
Figure 3B:
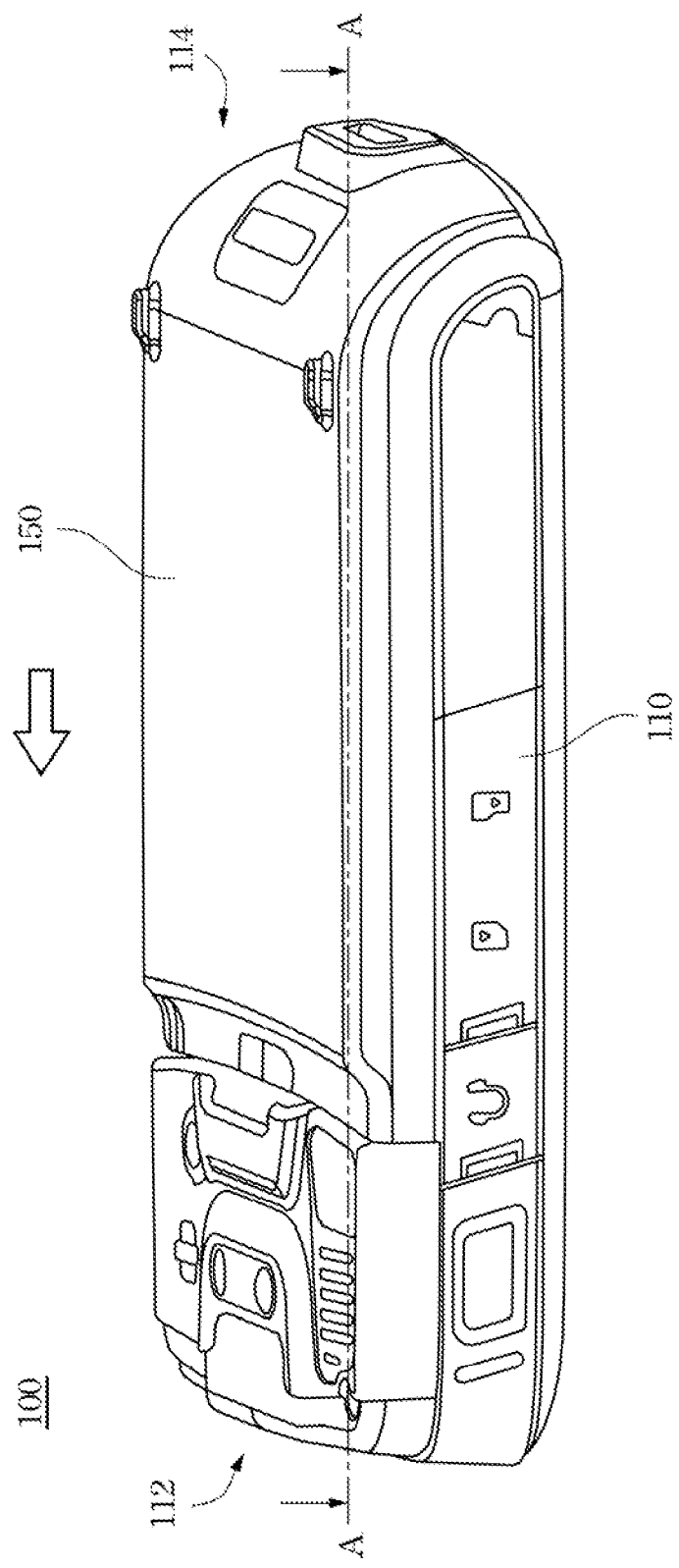
Figure 3C:
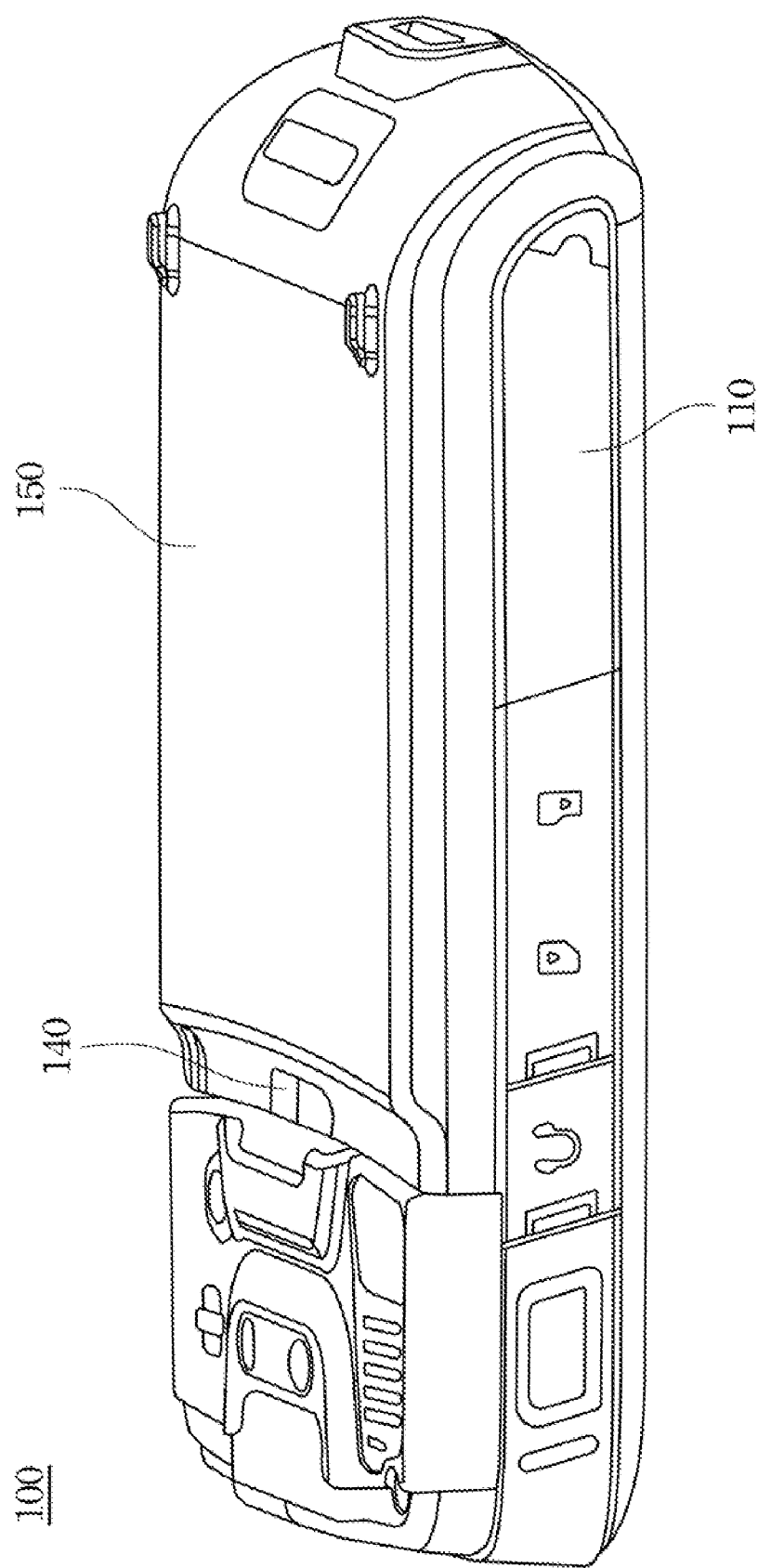

Referring to FIG. 3A to FIG. 3C, FIG. 3A to FIG. 3C are schematic diagrams respectively showing various stages for assembling the electronic device with the battery cover waterproof structure according to the embodiment of the present invention. In FIG. 3A, the battery cover 150 is pressed downwards relative to the body 110 so as to make the battery cover 150 contact the body 110 as shown in FIG. 3B. Thereafter, the battery cover 110 is slid from the second end 114 towards the first end 112, so that after the battery cover 150 is moved over the clips 142 of the push button 140 (referring to FIG. 3A), the battery cover 150 is engaged with the clips 142 of the push button 140 and secured as shown in FIG. 3C. Meanwhile, the push button 140 is exposed out of the battery cover 150.

If it is desired to release the battery cover 150 from being engaged with the body 110, it is only needed to press down the push button 140 exposed out of the battery cover 150 so as to sink and separate the clips 142 of the push button 140 from the battery cover 150, and thus the battery cover 150 can be removed from a reversed direction.

Figure 4:
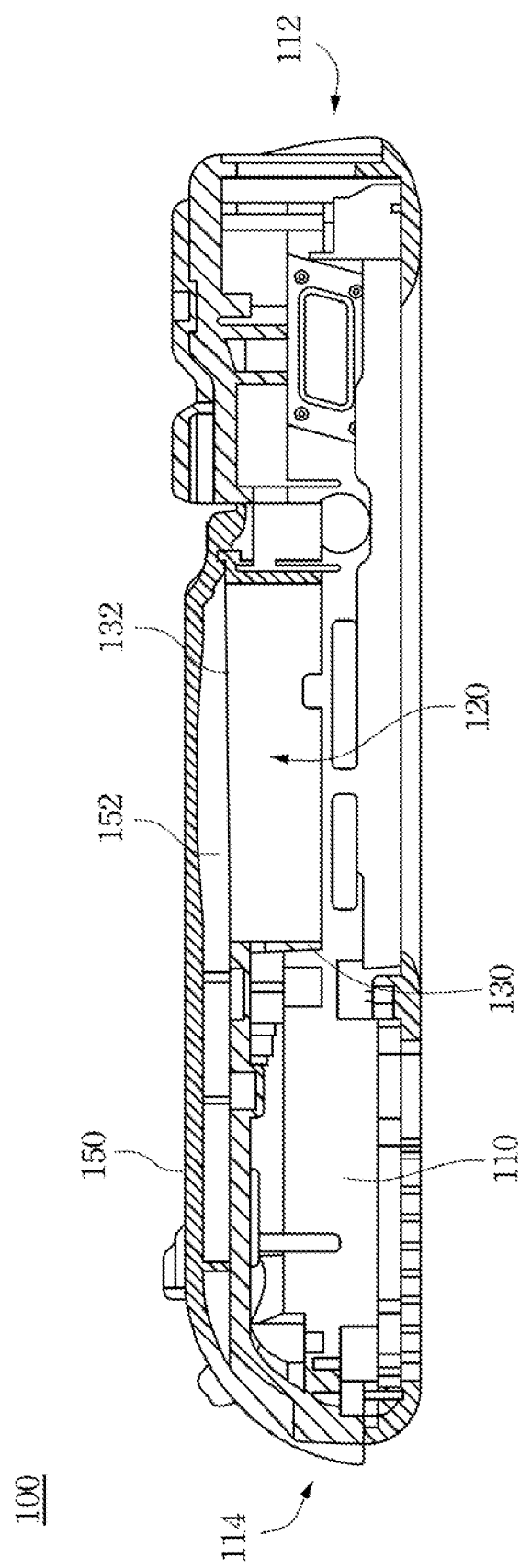
FIG. 4 is cross-sectional diagram of the electronic device with the battery cover waterproof structure viewed long line A-A shown in FIG. 3B.

Referring to FIG. 4, FIG. 4 is cross-sectional diagram of the electronic device with the battery cover waterproof structure viewed long line A-A shown in is FIG. 3B, and is mainly used for explaining the operation principle of the battery cover waterproof structure. In the electronic device 100 with the battery cover waterproof structure, the battery compartment 120 of the body has the waterproof gasket 130 of soft material disposed thereon, and the battery cover 150 has the oblique rib 152 of hard material disposed therein. When the battery cover 150 is slid from the second end 114 towards the first end 112, some interferences occur between the oblique rib 152 of the battery cover 150 and the oblique engage surface 132 of the waterproof gasket 130 disposed between the battery compartment 120 and the battery cover 150, so that the oblique rib 152 of hard material can be sealed with the oblique engage surface 132 of soft material, thereby achieving the purposed of sealing the battery compartment 120.

It can be known from the embodiments of the present invention that the application of the present invention has the following advantages. By means of sliding the battery cover relative to the body, the oblique rib of the battery cover can be sealed with the oblique engage surface of the waterproof gasket disposed around outside of the battery compartment, thereby achieving excellent waterproof efficacy. In comparison with the seating method using front press-fit, the design of the present invention using the oblique engagement can effectively reduce the space required for the waterproof structure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device with a battery cover waterproof structure, the electronic device comprising:
 a body having a first end and a second end;
 a battery compartment disposed in the body;
 a waterproof gasket disposed around outside of the battery compartment, wherein the waterproof gasket comprises an oblique engage surface, and one end of the oblique engage surface near the first end is elevated higher than the other end of the oblique engage surface near the second end;
 a push button which is disposed on the body and adjacent to one end of the battery compartment near the first end, the push button comprising a plurality of clips; and
 a battery cover coupled to the body, wherein the battery cover comprises an oblique rib arranged corresponding to the oblique engage surface, and one end of the oblique rib near the second end is elevated higher than the other end of the oblique rib near the first end; the battery cover further comprising a plurality of grooves, wherein, when the battery cover is pushed towards one end of the battery compartment near the first end from the other end of the battery compartment near the second end, the oblique rib will interfere with the oblique engage surface for sealing the battery compartment, the waterproof gasket disposed between the battery compartment and the battery cover, and the clips will be engaged with the grooves for securing the battery cover.

2. The electronic device as claimed in claim 1, wherein the waterproof gasket is formed from plastic.

3. The electronic device as claimed in claim 1, wherein the push button comprises an elastic member for providing the push button with an elastic return force after the push button is pressed down.

4. The electronic device as claimed in claim 1, wherein each of the clips has an inclined surface.

5. The electronic device as claimed in claim 1, wherein the body further comprises a plurality of positioning slide blocks disposed on an external side of the battery compartment, and the battery cover further comprises a plurality of positioning clips corresponding to the positioning slide blocks.

6. The electronic device as claimed in claim 5, wherein the positioning slide blocks are disposed backwards from the battery compartment.

7. The electronic device as claimed in claim 6, wherein each of the positioning slide blocks has a substantially L-shaped cross section.

8. The electronic device as claimed in claim 1, further comprising:
 a plurality of recesses disposed at the second end of the body; and
 a plurality of protruding blocks disposed at the other end of the battery cover corresponding to the second end, wherein the protruding blocks are adapted to engage with the recesses for positioning.

* * * * *